United States Patent [19]

Buob et al.

[11] Patent Number: 4,826,062

[45] Date of Patent: May 2, 1989

[54] AGRICULTURAL MARKING DEVICE

[76] Inventors: Haven E. Buob; Rebecca A. Buob, Both of Rte. #1, Box 39, Soap Lake, Wash. 98851

[21] Appl. No.: 54,508

[22] Filed: May 27, 1987

[51] Int. Cl.⁴ .............................................. B26F 3/00
[52] U.S. Cl. ......................................... 225/2; 225/93; 225/96; 83/53; 83/169; 83/177; 241/39
[58] Field of Search .............. 83/53, 177, 169; 225/2, 225/96, 94, 93, 100, 106; 241/39; 222/611

[56] References Cited

U.S. PATENT DOCUMENTS

| | | | |
|---|---|---|---|
| 2,117,396 | 5/1938 | Birr | 221/38 |
| 3,339,843 | 9/1967 | Horton | 239/157 |
| 3,428,019 | 2/1969 | Tillay et al. | 116/209 |
| 3,517,578 | 6/1970 | Krofta | 83/177 |
| 3,531,024 | 9/1970 | Rosselot | 222/611 |
| 3,891,157 | 6/1975 | Justus | 83/53 |
| 3,973,513 | 8/1975 | Huwe | 116/209 |
| 4,017,002 | 4/1977 | Doyle | 221/63 |
| 4,300,469 | 11/1981 | Huwe | 116/209 |

Primary Examiner—Donald R. Schran
Assistant Examiner—Eugenia A. Jones
Attorney, Agent, or Firm—Keith S. Bergman

[57] ABSTRACT

An agricultural marking device to disperse elongate strips of rolled paper-web material. A vertically orientated, cylindrical supply hopper has a securable lid. The lower portion of the hopper terminates in a conical transition directing web material in the hopper to an output channel. Drive rollers positioned adjacent to the output channel remove the web material from the supply hopper and deliver it through a downstream opening where a spray head is positioned. The spray head controllably directs a liquid spray onto the web material to separate it in the wetted region or dampen it to weight it. The device is secured to a mounting structure for mounting onto preselected portions of a propelling vehicle or an associated material dispensing device to thereby indicate a boundary of a portion of a traversed field by the web material deposited thereon.

13 Claims, 4 Drawing Sheets

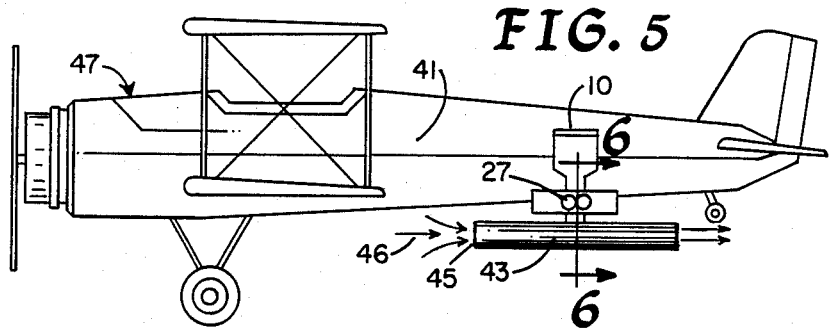
FIG. 5
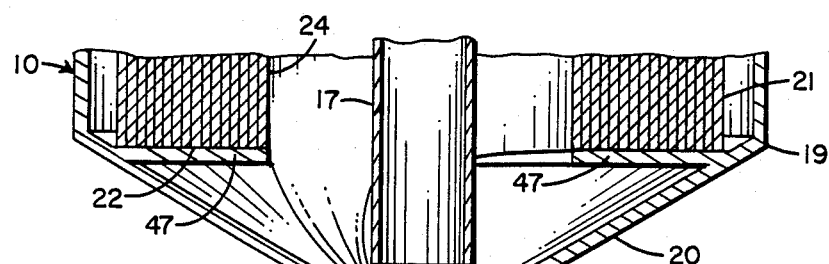
FIG. 6
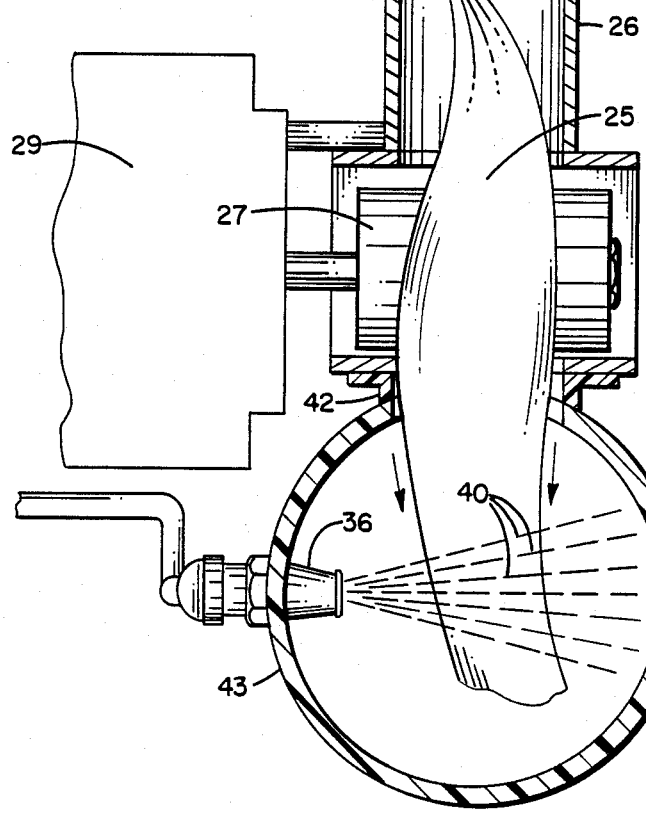

AGRICULTURAL MARKING DEVICE

BACKGROUND OF INVENTION

A. Related Applications

There are no applications for patent relating hereto heretofore filed in this or any foreign country.

B. Field of Invention

Our invention relates generally to a dispensing and severing device for an elongate web of material for geographic marking purposes.

C. Description of the Prior Art

Chemical treatment of agricultural land has become accepted practice to maintain and increase productivity. Competition, escalating costs of herbicides, pesticides and fertilizers applied to such land, and the labor intensive nature of farming in the present day all require, however, that expenditure of labor, use of machinery and operation of such endeavors must be as efficient as possible for the activity to be economically viable.

A common means to chemically treat agricultural fields is by use of distribution apparatus including a sprayer for liquid biologic compounds or a broadcaster for such compounds in solid form. Distribution apparatus of this type commonly distributes material over areas of substantial size, frequently over rows having widths in the range of 100 to 150 feet or more, oriented orthogonally to the course of travel of a dispenser. As it is desirable that the relatively costly chemical treatment compounds utilized be efficiently applied, past and current practice has utilized some type of visual marking of an area previously serviced to avoid duplication of effort and materials. Implementation of agricultural marking techniques unfortunately has not been efficiently accomplished to make them generally both economical and effective.

Some agricultural marking devices of the past have utilized dye and foam applied by various spray means onto a field to be treated to indicate boundaries of a portion of a field traversed. Such marking devices have not been completely satisfactory as the mixing and bulk storage of the additional liquid chemicals required for such marking methods and their handling for subsequent application have made the process cumbersome and time consuming. An alternative manner of marking a field has involved usage of mechanical marking devices dragged on the earth behind a distribution apparatus to impart a mark into the surface of a field to indicate the lateral extent of biologic chemical servicing. This class of marking devices creates a trough or indentation in the earth which may be visually observed, but often is difficult to establish without crop damage and usually is difficult to observe.

Other prior art employs paper markers for delimiting boundaries of agricultural chemical application, especially in aerial spraying. This art entails dropping of weighted strips of tissue to the earth by means of gravity to thereby indicate a flight course as an airplane traverses a field. Typical prior art aerial field marking apparatus has utilized paper interfolded accordion style with attached weight secured thereto to draw such marking paper downwardly to earth, where it comes to rest in random orientation.

Strip paper dispensers of various constructions are known, however their application to agricultural marking has not been well developed especially for marking elongate portions of a boundary on the boundary. A past impediment to effective use of a paper dispenser for agricultural marking has been the withdrawal and dispensement of marking paper from a supply source at a rate reasonably coordinated with the speed of a moving land vehicle. If marking paper be withdrawn too rapidly, the resultant marking tended to be askew of an actual path traversed by an agricultural vehicle, and if paper is withdrawn too slowly, inadequate marking results.

A further consideration in practical field use of a paper marking device, is that ordinary cutting means typically utilized are not effective in quickly separating a paper web as it is withdrawn from a hopper, tending to bunch or bind a web rather than accomplishing the severing process.

We provide a vertical cylindrical hopper closable at the upper end by a lid with a stabilizing rod depending medially into the hopper. This rod is medially positioned in the hopper and extends below a marking paper roll. Marking paper is withdrawn from a roll about its core and is thereafter fed through a transition section to an elongate dispersement channel. Paper in the channel spirals about the stabilizing rod by reason of its withdrawal thorugh this structure, and this spiraling contributes to web strength. Our device is functional, if not so well, without the depending stabilizing rod.

At least one driven roller, positioned exteriorly of the dispersement channel, feed paper through a flared conical skirt to a web wetting and separating device that sprays liquid onto the issuing web to thereby weight the web to allow more accurate positioning of the web in a field. Upon command, our invention provides means to halt the roller drive mechanism whereby the spray nozzle will continue to function to saturate a portion of the web at the edge of the deflecting skirt to effect tearing of the web at that point by reason of the web's reduced strength and the forces upon it. The liquid spray is aimed at the deflecting skirt's edge to avoid the web's adhering to the skirt's inner surface. Paper utilized with our invention is preferably of a short fiber, low wet-strength type that is bio-degradable, such as commercially available toilet tissue rolled without a central arbor or core. If arborless rolled paper is not available, however, a central arbor carrying a roll may be removed prior to use.

Our dispenser is mounted on a box-like base that is typically secured to a portion of a boom-like element, carried laterally of a conventional agricultural tractor, utilized in dispensing agricultural chemicals, so that it disperses paper upon an actual boundary of a traversed area.

Our invention may utilize an applied steady stream of liquid imparted onto a paper web at a reduced volume from that effecting separation. The liquid has the effect of weighting the web and tending to maintain its position as it is distributed onto a field. This becomes particularly useful when wind conditions would otherwise disturb position of a dry distributed web. Optionally, the liquid spray may be selectively applied to web material when using very low wet strength tissue, as in the use of such material, mere application of liquid to a passing web might be adequate to effect web separation.

Web material distributed by our device may optionally be continuously or selectively fed by the mechanism. Thusly an operator may conserve web material by distributing discrete pieces onto a field to effect discontinuous marking rather than distributing a single continuous stream of such material.

Our invention may further find application in aerial field marking by use of a somewhat modified species providing a wind tunnel to aid web material dispersement. Wetting the paper web along its length as it is distributed weights it, and upon command, halting the feed roller means to further saturate a portion of the halted web before the spray nozzle effects a separation of the web at that juncture, especially as aided by air flow in the wind tunnel.

Our invention resides not in any one of these features per se, but rather in the particular combination of all of them as herein disclosed and claimed and our invention is distinguished from the prior art in this particular combination of all of its structures that give rise to the functions necessarily resulting therefrom.

SUMMARY OF THE INVENTION

Our invention generally provides an agricultural marking apparatus for feeding webbed tissue material from a supply roll and selectively wetting and separating it by a liquid spray directed onto the web.

A vertical cylindrical hopper contains a roll of tissue web material formed of a short fiber and having low wet strength. A removable lid is releasably secured to the hopper, preferably with a stabilizing rod secured to the lid depending in the cylindrical hopper. A transition section secured to the hopper communicates to a diametrically smaller cylindrical dispersement channel which directs the web-like material between an opposed pair of positively driven feed rolls that feed the web material through a deflecting skirt and past a web separating spray. The spray nozzle imparts a spray of liquid onto the web at the deflecting skirt edge. Web feeding and separating are both selectively controllable by an operator to feed predetermined lengths of marking web as desired. The selective web feed halts the web feed rolls and thereby allows saturating of the web portion positioned adjacent the spray nozzle to effect separation of the web at that position.

In creating such a device, it is:

A principal object of our invention to provide a selectively activated web feed and cut off apparatus to efficiently and effectively distribute elongate rolled web material for marking purposes.

Another object of our invention to provide a medial, axially coincident positioning rod within the web supply hopper to aid the tangle free and smooth feed of web material from the hopper and impart a twist to add strength to the issuing web.

A further object of our invention to provide at least one driven roller, selectively operable, to withdraw web material for positive distribution for marking.

A still further object of our invention to provide a liquid spray nozzle that may be selectively activated to wet web material to weight it or saturate the material to enable predetermined separating for marking purposes.

A further object of our invention to provide such a paper web distributing apparatus that feeds and distributes a roll of web material from about its inner diameter to make dispersement substantially free of binding or bunching and provides a deflecting skirt associated with the liquid spray means to avoid fouling of the wetted material upon dispersement.

A still further object of our invention to provide such a device that is of new and novel design, of rugged and durable nature, of simple and economic manufacture, and one otherwise well suited to the uses and purposes for which it is intended.

Other and further objects of our invention will appear from the following specification, accompanying drawings and claims which form a part hereof. In carrying out the objects of our invention, however, it is to be understood that its essential features are susceptible of change in design and structural arrangement with only one practical and preferred embodiment being illustrated and specified, as is required.

BRIEF DESCRIPTION OF DRAWINGS

In the accompanying drawings which form a part hereof and wherein like numbers of reference refer to similar parts throughout:

FIG. 5 is an orthographic, somewhat diagrammatic, side view of a species of our invention secured to the fuselage of an airplane.

FIG. 6 is an enlarged vertical cross-section view of the species of our invention of FIG. 5, taken on the line 6—6 thereon in the direction indicated by the arrows.

DESCRIPTION OF THE PREFERRED EMBODIMENT

Figure 1:
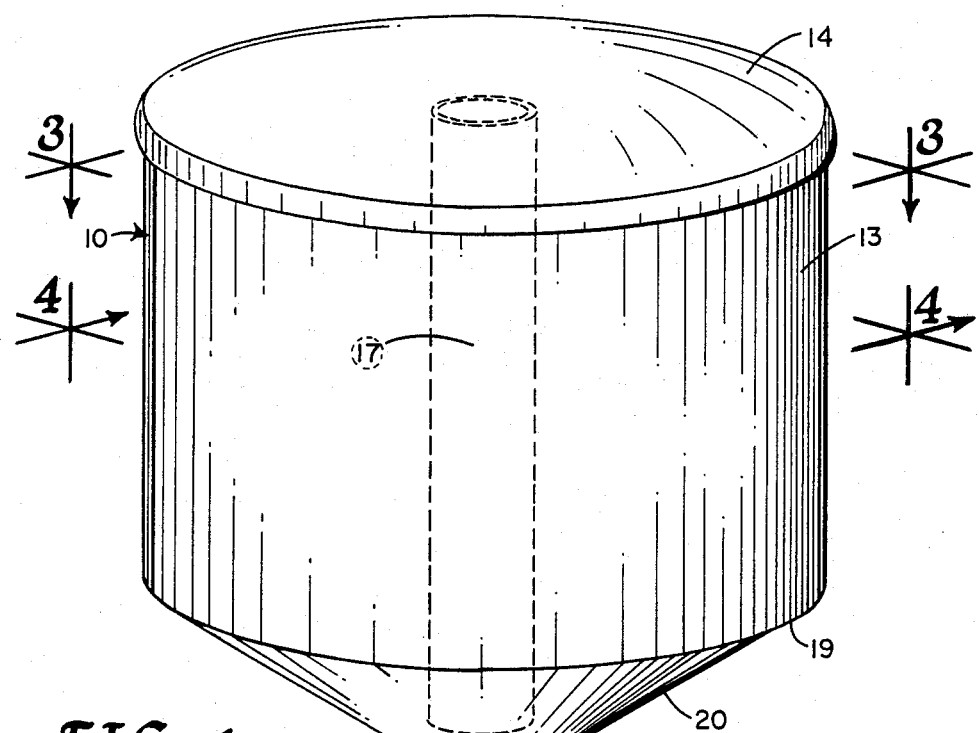
FIG. 1 is an isometric surface illustration of our invention showing its various elements, their configuration and relationship with one another.

Our invention generally provides web supply housing 10 from whence a rolled web of tissue material is withdrawn by a powered feed roll, in mounting housing 11, which supplies the web material through a dispersement channel and past spray mechanism 12 for selective wetting, separation and distribution.

Supply housing 10 is formed as a cylindrical hopper 13 provided with removable containment lid 14. The containment lid is securable to hopper 13 by a press fit connection, as illustrated, or by a threaded connection or the like as heretofore known to releasably secure lids to containers. Laminated to the inner surface of containment lid 14 is resilient sponge-like material 15 interfacing between the containment lid 14 on one side and a further laminate on the other side formed as smooth polymeric bearing surface 16, that in use imposes a degree of pressure upon upper surface 23 of contained roll of web material 21 to be dispensed by the instant invention. Lid 14, resilient material 15, and bearing material 16 may be formed as a bonded or unbonded laminae structure, as desired.

Positioning rod 17 is fixedly secured to containment lid 14, as by threaded connection shown for example, to depend downwardly into hopper 13. Terminal end 18 of the positioning rod extends a distance below lower boundary edge 19 of hopper 13. Though the positioning rod is an aid to the functioning of our invention, its use is not necessary and the rolled web material may be dispersed without it and will still tend to spiral as it is unrolled.

Transition section 20, in the instance illustrated of conical configuration, is secured to hopper 13 at its lower boundary edge 19 to extend therebelow and peripherally define an enclosed area about the lower portion of the positioning rod.

A roll of web material is positioned within hopper 13 in use. The hopper is dimensioned to accept a particularly configured roll of web material with bottom face 22 of the roll resting in the upper portion of conical transition 20 and on horizontal annular shelf 47 for support. The roll is maintained in place with some pressure by reason of coacting force applied to top face 23 of the web material by lid 14 acting through resilient material 15 and bearing surface 16, while paper may pass through the medial hole in shelf 47 for dispersement. This shelf may not always be necessary to our invention but its use tends to prevent fouling of paper during dispersement, particularly from a fairly well exhausted roll of web material.

Figure 3:
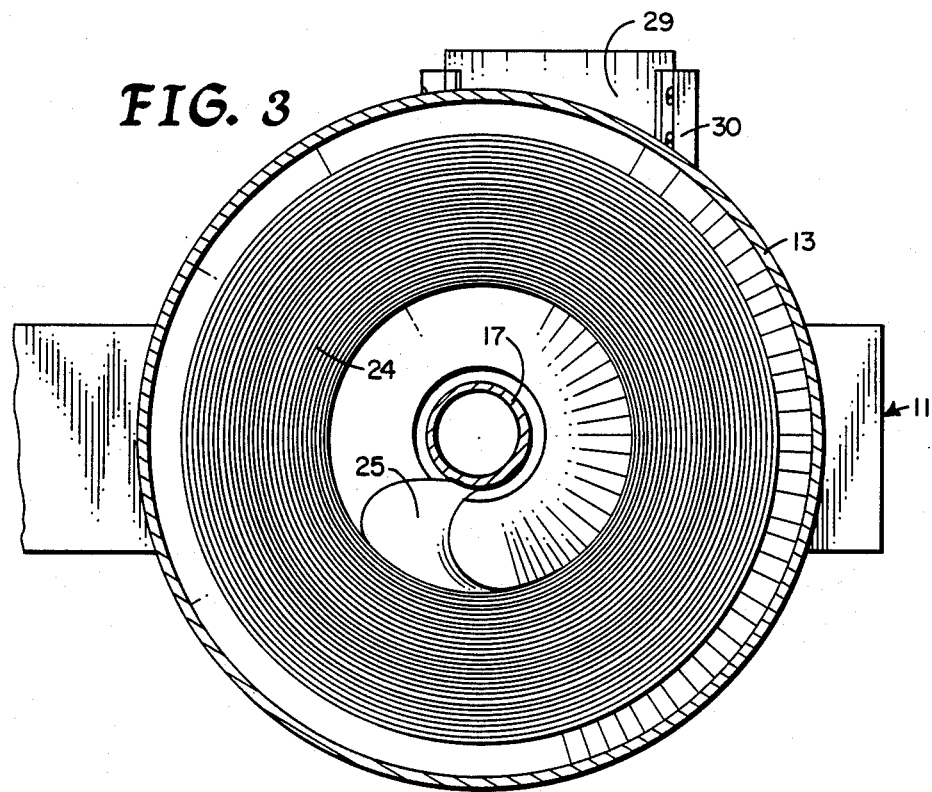
FIG. 3 is a horizontal cross-sectional view through the hopper assembly of FIG. 1, taken on the line 3—3 thereon in the direction indicated by the arrows.
Figure 4:
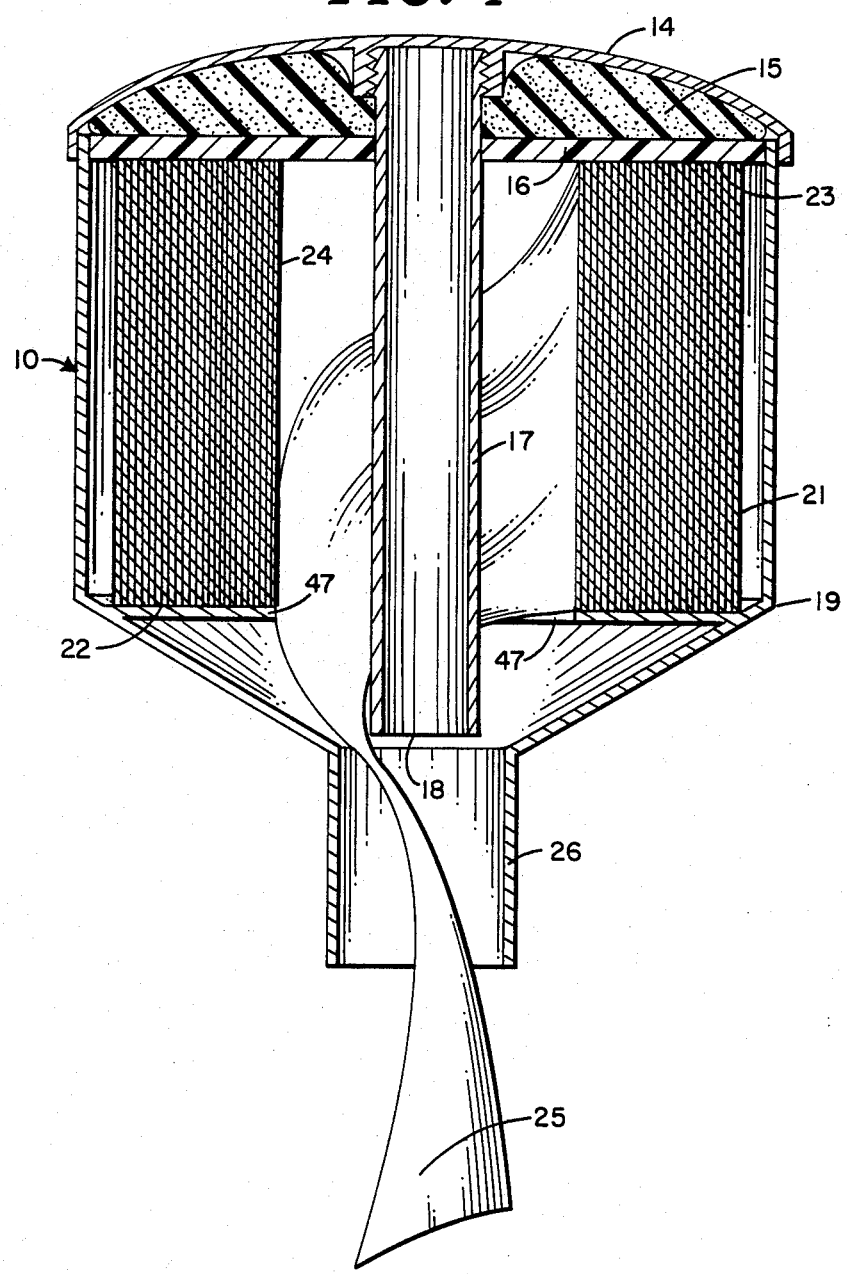
FIG. 4 is a vertical cross-sectional view through the hopper assembly of FIG. 1, taken on the line 4—4 thereon in the direction indicated by the arrows.

Web material preferred for use in the instant invention is of a short fiber type with an attendant low wet strength. Commercially available toilet tissue is ideal, but it is desirable that a commercially available non-perforated roll of such material be utilized to avoid preweakened areas about perforations. As best seen in FIG. 3, web material 25 is removed from about the inner diameter of roll 21, and accordingly the material must not have a central arbor or core, or if a core is present it must be removed to enable web material to be unwound from about the inner surface of a roll.

It may be appreciated from the foregoing that roll material 21 is frictionally secured within the confines of web supply housing 10. The use of polymeric bearing surface 16 and its associated resilient sponge-like backing material 15 is optional, but these elements enhance the securement of web material within the supply housing. Smooth surface 16 furthermore does not interfere in withdrawal of material and will aid material positioning within the housing and its withdrawal therefrom.

Feed tube 26 is joined to transition element 20 at the lower terminal end 20a of that later element. The feed tube is configured with a diameter and length to enable web material 25 to form a spiral as it is withdrawn about rod 17 from its roll in housing 10. Though not necessary, spiralling of the unrolled web material is desirable in the instant invention as it aids in enhancing tensile strength of the web to thereby resist premature or unwanted separation as the material is withdrawn and fed for distribution.

Feed tube 26 is secured to feed housing 11 which journals paired cooperating feed rolls 27 and 28. Feed roll 27 is driven by a suitable motor 29 secured to housing 11 through appropriate support bracketry 29a. Gear mechanism 30 transmits power from the motor to driven feed roll 27 at a variable preselected speed. Gear selection is determined by desired output velocity of web material 25 and is practically limited by tensile or burst strength of that material. Web output speed is therefore selected to approximate the velocity of a support vehicle 32 that propels our marking device over a surface to be marked. Other speed control means such as rheostatic control of motor 29 may be utilized to control output velocity of feed rolls 27 and 28 and remain within the ambit of our invention.

Feed roll 28 is formed as a slave roll and is frictionally driven by feed roll 27 by reason of its position in frictional engagement therewith to deliver web 25 therebetween. Feed rolls 27 and 28 are each provided with suitable non-slip peripheral traction surfaces formed of a resilient high friction material to aid driving and web motion therebetween. The slave feed roll obviously could be replaced with similar structures such as a rub bar, but the functioning of such structures is somewhat less efficient. Feed rolls 27 and 28 are journaled and they and motor 29 are secured by suitable conventional bracketry to housing 11 which is attached at desired position on a supporting vehicle.

Opening 34, defined in bottom surface 33 of housing 11, is spacedly below the web output area of feed rolls 27, 28. Downwardly depending and upwardly flaring deflecting skirt 35 is secured to the perimeter of opening 34 below lower element 33 of housing 11. Severing spray nozzle 36, fed a suitable liquid such as water by delivery tube 37, is positioned by appropriate bracketry 38, preferably above lower edge 39 of skirt 35. This positioning is desirable so that the deflecting skirt will tend to shelter web 25 adjacent the spray head from winds and other disturbances at ground level and thereby enable spray 40 to properly wet the web. Skirt 35 is illustrated as a section of a truncated cone but it is to be understood that other skirt configurations may be utilized to shelter web 25, nozzle 36, and its associated spray 40.

Nozzle 36 is oriented to direct its output spray 40 approximately at the lower edge 39 of the deflecting skirt to thereby cooperate with said edge for wetting and ultimate separation of web 25. Direction of spray 40 onto the interior surface of deflecting skirt 35 might produce an adverse result tending to adhere a wetted web 25 to the interior surface of skirt 35 to disrupt web distribution.

Actuation of spray 40 from nozzle 36 is preferably electronically controlled by suitable remote means (not shown) operable by an operator in control of propelling vehicle 32. As web material is sufficiently wetted by spray 40, separation will occur. The combination of relatively low wet tensile strength of the web material combined with tension imposed by web material already distributed will aid separation of web 25 in an appropriately saturated area.

Our marking apparatus may be utilized in various modes. As noted, issuing web material 25 may be wetted by activation of spray nozzle 36 at selected intervals to saturate a portion of the web and effect tearing. Another operative mode may provide for a continuous wetting of web 25 at a reduced spray intensity, less than that required for separation, as web 25 passes before spray 40 from nozzle 36. When web separation is desired, web feed is arrested by deactivation of motor 29, whereupon a portion of web 25 positioned adjacent nozzle 36 is saturated to effect web separation. Such continuous web wetting may be desired, for example, at times when adverse wind conditions may require added web weight to aid in maintaining proper web positioning as the web is applied onto an agricultural field.

A species of our invention adaptable to aerial marking is illustrated in FIG. 5 where it is seen secured to the underside of fuselage 41 of airplane 47.

In this application drive rollers 27 and 28 feed web 25 from an upper supply housing 10 as before. The feed rollers in this instance direct the web to and through conduit 42 which in turn directs the web into open end dispensing conduit 43, orientated substantially parallel to the course of motion of the propelling aircraft.

Forward end 45 of conduit 43 allows air from the ambient atmosphere to enter with some velocity, as caused by aircraft motion, so that the air will be directed rearwardly through dispensing conduit 43. Spray nozzle 36 is positioned in the medial portion of the dispensing conduit below and rearwardly of its intersection with conduit 42. The spray nozzle operates continuously so that web 25 is constantly wetted along its length. The web will be moved rearwardly through and rearwardly of conduit 43 and thence downwardly and onto a field to be marked by action of gravity on the water-weighted paper web 25. If severance tearing of web 25 is desired, feed roll rotation is halted, whereupon that portion of web 25 positioned adjacent nozzle 36 continues to be wetted and will thereby separate due to its low wet strength and the extensive force exerted by the already dispersed web.

As opposed to operation of our device on a land drawn marking apparatus, air directed through conduit 43, as indicated by arrows 46, will prevent web 25 from adhering to the inner conduit surface so spray head 36 may be positioned within tubular conduit 43.

The control mechanism and methods by which the various functions and operations of our invention are accomplished are well known and heretofore commercially available for similar purposes. These mechanisms and methods are therefore not described or specified in any detail. Preferably they are, however, of a remote nature so that they may be operated by an operator of a vehicle propelling our device.

Figure 2:
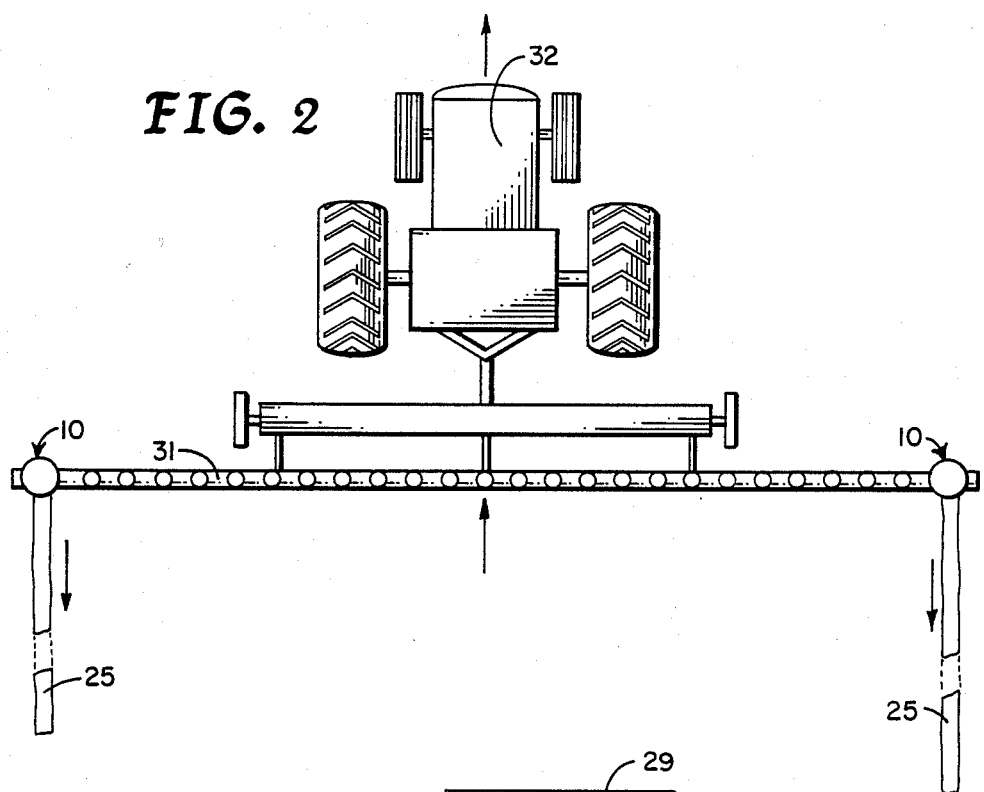
FIG. 2 is an orthographic top view showing two of our inventions positioned at lateral extremities of an agricultural chemical distribution device propelled by a conventional tractor.

A brief description of the operation of our invention follows:

An operator attaches a boom-like dispersal member 31 to farm vehicle 32 for traversal across an agricultural field to be serviced. The boom-like member distributes desired chemicals, such as fertilizer, herbicide, pesticide or the like. To ascertain the area of boom coverage, the marking apparatus of the instant invention is attached by means of feed and mounting housing 11 at a preselected position along boom member 31 to indicate the border of boom travel as illustrated in FIG. 2.

Containment lid 14 is removed, and a roll of appropriate tissue-like web material is inserted within hopper 13. The web material is seated within the hopper upon support surface 47 in transition portion 20 and there secured by replacement of lid 14. An initial lead of web material 25 is manually threaded about positioning rod 17, through feed tube 26 and into frictional engagement between feed rolls 27 and 28. When an operator of vehicle 32 initiates traversal of a field and chemical application thereon, he merely energizes motor 29 to dispense a marking web 25 therealong. When desired, feed roll rotation is halted automatically at predetermined periods or by an operator whereupon a spray issuing from nozzle 36 continues to impart fluid onto the adjacent web portion which is thereby separated in that wetted area.

The marking device of the instant invention may be positioned optionally along boom 31 not only at the distal ends but at any desired intermediate location to permit field marking as desired. Similarly more than one device may be used on a single boom. If, for example, the chemical distribution structure is casting out plural chemicals along various parts of the boom, the marking device may be utilized at the juncture of dispersement areas of the various chemicals employed. In this fashion, the marking device of our instant invention will enable a more efficient application of the biologic compounds utilized in contemporary farming to assist in the minimization of lost man hours and equipment usage.

Normally a continuous feed of web material is not desired in the interests of conserving the web material, nor is it required for marking purposes. To accomplish a discontinuous distribution, web feed may be selectively halted either manually or automatically by control means known but not shown. Such non-continuous marking may be used in either land or aerial applications.

A variation of our device may include a liquid spray nozzle selectively controlling spray intensity and concentration to wet a passing web for particular purposes.

The marker of our instant invention may for particular purposes accommodate various marking materials and liquid wetting agents other than toilet tissue and water.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and what we claim is:

1. A method of marking a field with elongate paper-like web material, comprising in combination:

containing an axially vertically orientated roll of elongate web material, having a tensile strength greater in a dry state than in a wet state, in a dispersement mechanism with a hopper having powered means for downward dispersement of the web material therefrom;

passing the dispersed web material through a liquid spray created by a fixedly positioned liquid spray means to wet the web material to decrease its tensile strength and to weight the material to allow more ready selective separation thereof than in a dry state; and transporting the dispersement mechanism at a spaced distance above a course to be marked while dispersing web material therefrom.

2. The method of claim 1 further characterized by control means to allow periodic dispersement of web material from said hopper, and to periodically operate said liquid spray means responsive to web material dispersement.

3. A field marking apparatus to dispense and sever a rolled web of paper-like marking material comprising, in combination:

a hopper configured to accept an axially vertically oriented roll of web material;

a transition section depending from and secured to said hopper at a first upper end and to an outlet means at a second lower end, said transition section supporting said roll of web material, and said outlet means positioned for directing said web material along a feed path from said hopper through said transition section to web separating means;

powered feed means to remove web material from the hopper and move the web material along a feed path; and web separating means including a nozzle fixedly positioned downstream of said outlet means for directing a liquid onto said web material to wet said web material to decrease its tensile strength and to weight the material in order to effect selectively web separation thereof.

4. A marking apparatus as set forth in claim 3 wherein said hopper has secured thereto a removable lid, said lid having a depending positioning rod extending from the medial part of the lid to at least the transition section for guiding the web material withdrawn from the roll of web material thereabout.

5. A marking apparatus as set forth in claim 4 wherein said lid provides on its inner surface resilient material that has a smooth, low friction bearing-like lower surface to impart stabilizing pressure upon a supply roll of web material.

6. A marking apparatus as set forth in claim 3 wherein said outlet means of the transition section includes a feed tube secured to the second end of said transition section to direct web material therethrough.

7. A marking apparatus as set forth in claim 3 wherein the powered feed means including a pair of rollers positioned in said feed path between said transition outlet means and said web separating means.

8. A marking apparatus as set forth in claim 3 wherein said housing means is attached to a land drawn agricultural implement.

9. A marking apparatus as set forth in claim 3 wherein said housing means is attached to an air craft.

10. A marking apparatus as set forth in claim 6 wherein skirt means, including a flared skirt with terminal edge of predetermined length is positioned below said nozzle and downstream of said feed means for cooperation with said nozzle to effect web separation.

11. A marking apparatus as set forth in claim 9 having a dispensing conduit substantially perpendicular to said outlet means, and extending substantially parallel to aircraft motion, said nozzle being positioned within said dispensing conduit to spray web material dispensed therefrom.

12. A field marking apparatus for agricultural purposes to contain, sever and disperse an elongate web of rolled paper-like material having a relatively low wet strength, especially to delineate boundaries of chemical application, comprising in combination:

a vertically orientated cylindrical hopper defining a chamber to contain a roll of elongate web material to be dispersed, said roll of web material having a medial void and said hopper having at its first upper end a releasably positionable lid with resilient laminae on its under-surface to contact the upper surface of rolled web material carried therein and a positioning rod carried in a medial position thereby to depend through the medial void in the roll of web material at least to the lower edge of the hopper and at its second lower end a transition section having a lowermost outlet orifice and configured to support a roll of web material with frictional force against the lid;

outlet means directing web material from the outlet orifice of the transition section to a feed and mounting housing;

a feed and mounting housing having powered means for removing elongate web material from the medial portion of a roll of such material carried in the supply hopper; and liquid spray means downstream of said feed and mounting housing to direct liquid onto web material adjacent to weight that material and effect selective separation thereof.

13. The invention of claim 12 further characterized by:

the powered means for removing web material comprising two frictionally engaged cooperating rolls passing the web material therebetween;

the feed and mounting housing passing web material to and through a depending dispensing channel; and the spray means being adjacent said dispensing channel to spray web material exiting therefrom.

* * * * *